United States Patent [19]
Strelow

[11] Patent Number: 5,558,114
[45] Date of Patent: Sep. 24, 1996

[54] ECCENTRIC SCORED RUPTURE DISK ASSEMBLY

[75] Inventor: John L. Strelow, Broken Arrow, Okla.

[73] Assignee: Oklahoma Safety Equipment Co., Broken Arrow, Okla.

[21] Appl. No.: 418,564

[22] Filed: Apr. 7, 1995

[51] Int. Cl.$^6$ .................................................. F16K 17/16
[52] U.S. Cl. ..................... 137/68.27; 137/68.21
[58] Field of Search ............................ 137/68.21, 68.27

[56] References Cited

U.S. PATENT DOCUMENTS

| | | | |
|---|---|---|---|
| 2,224,748 | 12/1940 | Sauer | 220/89 |
| 2,661,753 | 12/1953 | Stroop | 137/68 |
| 2,954,897 | 10/1960 | Hansen et al. | 220/89 |
| 2,987,218 | 6/1961 | Erickson et al. | 220/89 |
| 3,698,598 | 10/1972 | Wood et al. | 220/89 A |
| 4,072,160 | 2/1978 | Hansen | 137/68 R |
| 4,158,422 | 6/1979 | Witten et al. | 220/89 A |
| 4,512,171 | 4/1985 | Mozley | 72/55 |
| 4,553,559 | 11/1985 | Short, III | 137/68.1 |
| 4,597,505 | 7/1986 | Mozley | 220/89 A |
| 4,721,224 | 1/1988 | Kawabata | 220/89 A |
| 4,951,697 | 8/1990 | Fritts | 137/68.1 |
| 5,002,085 | 3/1991 | Fitzgerald | 137/68.27 |
| 5,005,722 | 4/1991 | Short, III et al. | 220/89.1 |
| 5,154,202 | 10/1992 | Hibler, Jr. et al. | 137/68.1 |
| 5,267,666 | 12/1993 | Hinrichs et al. | 220/89.2 |
| 5,305,775 | 4/1994 | Farwell | 137/14 |

*Primary Examiner*—John C. Fox
*Attorney, Agent, or Firm*—Jones, Day, Reavis & Pogue

[57] ABSTRACT

A rupture disk with an annular flange that permits the disk to be clamped in place in a pressure system between an outlet holder and an inlet holder. The rupture disk is characterized by an eccentric score line formed on its annular flange radially outwardly beyond the dome of the rupture disk. A spacer and support ring are utilized to assist in the removal of that portion of the annular flange of the disk which ruptures from between the outlet holder and inlet holder.

15 Claims, 2 Drawing Sheets

ECCENTRIC SCORED RUPTURE DISK ASSEMBLY

BACKGROUND OF THE INVENTION

1. Field of the Invention

The present invention relates generally to a two-directional pressure relief assembly for use in a fluid transportation system and in particular to a rupture disk assembly having an eccentric groove or score line formed in a flange portion of the disk assembly for relieving pressure in a safe manner.

2. Description of Related Art

Relief devices of the type commonly known as rupture disks have been utilized by the industry for many years to provide a safety mechanism to relieve excessive pressure from an over-pressurized system or vessel in a reliable manner. Through the years, numerous improvements have been made in the rupture disk in order to reduce the cost and to improve its simplicity and reliability.

One type of disk is known as the reverse buckling rupture disk and is positioned in the system such that a dome formed with the disk is positioned in the vent pointing towards the pressure side of the vent. Thus the convex side of the dome faces the upstream side of the vent wherein pressurized fluid is located. Such disks can be operated at pressures that are very close to the bursting pressure of the disk. The dome collapses when fluid pressure reaches a preselected pressure for which the dome is designed. As the dome is ruptured, it is forced in the direction of the downstream side of the system.

It is important that the elements of the rupture disk be retained by the remainder of the disk after being ruptured. If any portion of the rupture disk escapes into the fluid system, it can cause damage to valves and other equipment. Thus it is extremely important that the rupture disk dome and any portions thereof remain intact after rupture and remain attached to the assembly in which they are mounted.

The prior art utilizes several methods of ensuring proper rupture while retaining the parts of the ruptured disk with the mounting elements. Some use knives to cut the dome when it is ruptured and form a pattern so as to cause petals that are held to a flange portion of the disk by tabs. Others use grooves, scores, or etchings on the dome of the reverse buckling rupture disk. When such a device ruptures, it fractures along the lines of weakness produced by the grooves so as to form petals that are held by flange portions to the remainder of the assembly.

It would be advantageous to have a rupture disk assembly that provides progressively more resistance to tearing as the tear progresses. Such a device could be formed to begin its tear or rupture at a predetermined pressure but would become more difficult to rupture because of the increasing resistance, thus reaching a point where the rupture stops leaving a large area to retain the ruptured portion in the remainder of the assembly.

SUMMARY OF THE INVENTION

Thus, the present invention relates to a scored flange, domed rupture disk assembly having a retaining flange portion with an inside diameter and an outside diameter and a central bulged dome portion connected to the inside diameter by a transition portion. The bulged dome portion has a convex side and a concave side. The disk has a rated pressure on one side thereof at which the disk buckles in the direction of pressure. An arcuate score line is formed on the flange portion of the disk and is eccentric with the bulged portion. The score line creates a line of weakness such that sufficient pressure applied to the bulged portion causes the disk to rupture along the eccentric score line. When the pressure exceeds a "set point", the disk dome buckles and reverses or turns inside out. The "set point" buckling or reverse pressure is controlled primarily by the material thickness and then by the height of the dome. The score line has a small effect on the reverse buckling pressure because the radial stresses in the flange area are small until the disk buckles or reverses. After reversal, the tension stresses in the score are large enough to tear the score. The score is made weak enough to provide protection against improper installation such as when a damaged disk is installed or a disk is installed upside down.

The present invention assures that the petal is retained in the assembly after rupture. The eccentric score line provides progressively more resistance to tearing as the tear progresses from the score area closest to the bore to the score area farthest away from the bore and the closest to the hinge area. This is true because more material must be pulled between the flanges at the ends of the scores into the hinge area.

A spacer is used with the disk flange and the spacer thickness will also affect the resistance of the disk material being pulled from between the flanges.

A score line may be formed in either side of the flange portion of a disk assembly to form either a reverse buckling domed rupture disk assembly or a forward-acting domed rupture disk assembly. The score line has a first end thereof positioned a spaced apart distance from a second end thereof with the center of the arcuate score line being closest to the outer edge of the domed portion or the inner diameter of the flange portion. The ends of the score line are farthest from the inside diameter of the flange portion. This enables the disk to begin to rupture easily about that part of the score line closest to the inside diameter of the flange portion since there is less material to tear. However, the eccentric score line provides progressively more resistance to tearing as the tear progresses because there is more material that must be pulled between the flanges at the end of the score line in the hinge area.

Thus, it is an object of the present invention to provide a safety pressure relief device including a buckling disk assembly having a retaining flange portion in which an arcuate score line is formed eccentric with the outer circumference of the buckling disk assembly.

It is also an object of the present invention to provide a domed reverse buckling disk assembly that begins to buckle at a predetermined pressure but that becomes more difficult to rupture as the tear progresses because of a greater amount of material that is being pulled from between the holder flanges.

It is still another object of the present invention to provide a reverse buckling disk assembly with a flange portion in which an eccentric score line is formed to allow the domed assembly to rupture under a predetermined pressure and still retain the rupture dome assembly in the holder thereof.

BRIEF DESCRIPTION OF THE DRAWINGS

These and other features of the present invention will be more fully disclosed when taken in conjunction with the following DETAILED DESCRIPTION OF THE DRAWINGS in which like numerals represent like elements and in which.

DETAILED DESCRIPTION OF THE DRAWINGS

Figure 1:
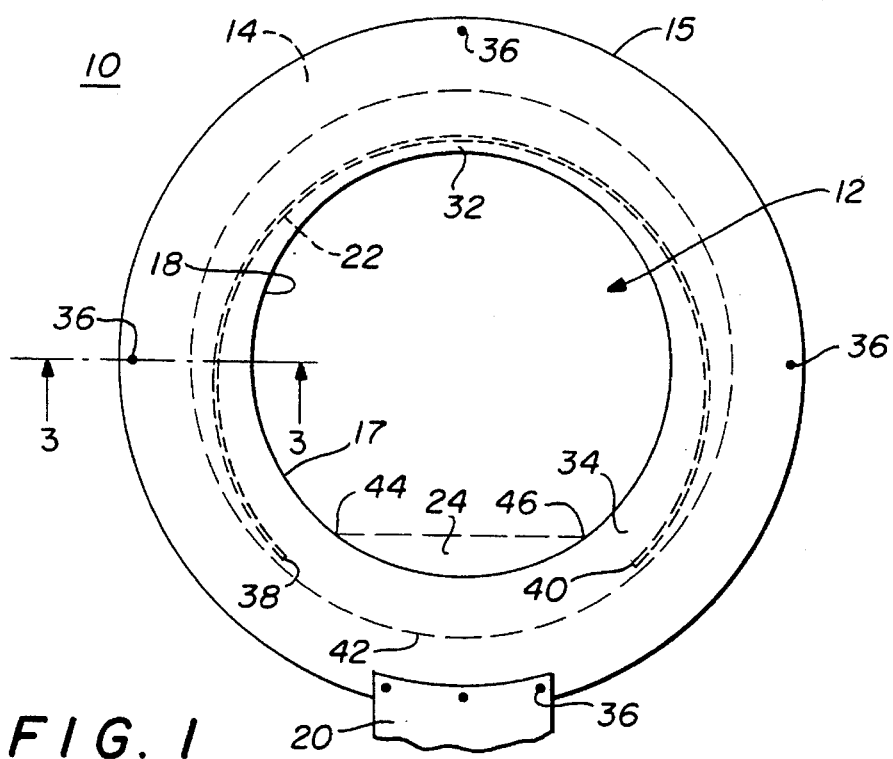
FIG. 1 is a plan view of the novel pressure relief device of the present invention.
Figure 2:
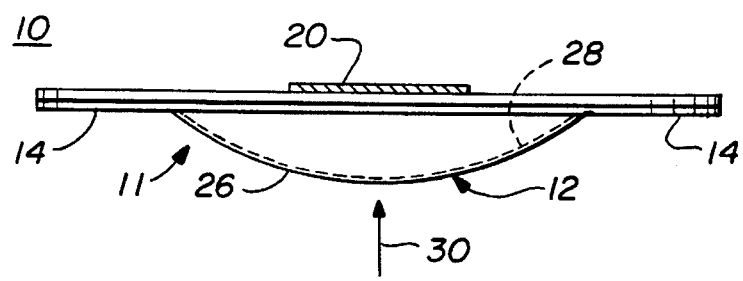
FIG. 2 is a schematic representation of a side view of the novel pressure relief device.

FIG. 1 is a plan view of the preferred embodiment of the present invention and shows a safety pressure relief device 10 including a reverse buckling rupture disk 11 (shown in FIG. 2) that has a bulged dome rupture disk portion 12 in the shape of a bulged dome with which is integrally formed a retaining flange portion 14 having an outside diameter 15 and an inside diameter 18. The central bulged dome rupture disk portion 12 is connected to the inside diameter 18 of the retaining flange portion 14 by a transition portion 19 that is coterminous with the inside diameter 18 of flange portion 14, shown most clearly in FIG. 3. The bulged dome rupture disk portion 12 has a convex side 26 and concave side 28 as best seen in FIG. 2. An arcuate score line 22 is formed on the flange portion 14 of the assembly 11 that is eccentric with relation to the bulged or domed portion 12, eccentric with relation to the inside diameter 18 of the retaining flange portion 14, and eccentric with relation to the outside diameter 15 of the rupture disk 11. The eccentric score line 22 creates a line of weakness such that pressure applied to the bulged rupture disk 12 in the direction of arrow 30 in FIG. 2 causes the disk portion 12 to buckle and then rupture along the eccentric score line 22. Reverse buckling disks corresponding to the one shown in FIG. 1 are designed such that when the pressure exceeds the "set point", the disk shell or dome portion 12 buckles and reverses or turns inside out. The "set point" buckling or reverse pressure is controlled primarily by the material thickness and then by the crown height (height of the dome 12). The score line 22 has a small effect on the reverse (buckling) pressure because the radial stresses in the flange area 14 are small until the ruptured disk 12 begins to reverse its position. After reversal, the tension stresses in the score line 22 are large enough to tear the score line 22. The score line 22 is made weak enough to provide protection against improper installation such as a damaged rupture disk or an upside down installation.

It is important that the petal formed by the reversal of the domed rupture disk 12 be retained in the holder system after rupture. There are two primary features in the present design that provide "retainability" of the petal formed by the buckled rupture dome portion 12. The first is that the eccentric score line 22 provides progressively more resistance to tearing as the tear progresses from the score area 32 that is closest to the dome portion 12 to the score area 34 that is closest to the hinge area 24. This occurs because more material must be pulled or forced from between the system flange holders 50 and 52 (shown in FIG. 6) at the ends of the score line 22. Thus as can be seen by looking at the FIG. 1, when the disk 10 begins to rupture along score line 22 in the area 32 that is closest to the dome, there is very little metal that has to be pulled between the holders in the area 32. However, as the tear progresses around each side of the arcuate shaped score line 22, the distance of the score line from the transition portion 19 or inner diameter 18 of the flange portion 14, the amount of material that must be pulled between the holders is greater in the area 34.

Figure 3:
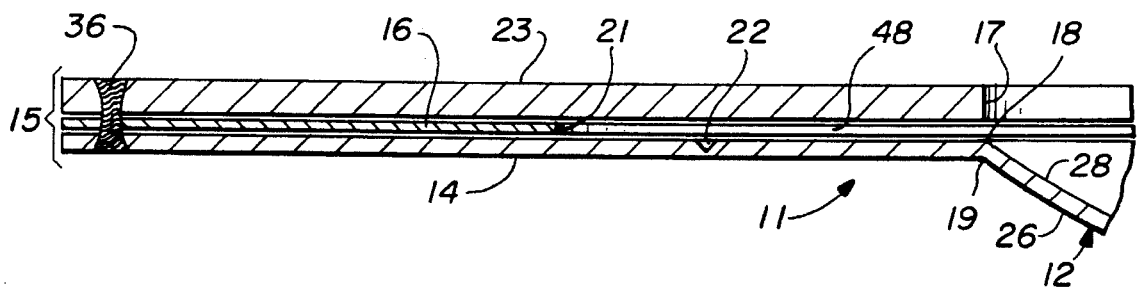
FIG. 3 is an enlarged view of a side portion of the novel pressure relief device.

Further, with the present novel invention, a spacer 16 is provided as shown in FIG. 3 that also affects the resistance of the disk material in flange portion 14 as it pulled from between the flange holders. As can be seen in FIG. 1, a nameplate 20 may also be attached by any well-known means such by spot welds 36.

FIG. 2 is a schematic side view of the novel pressure relief device 10 shown in FIG. 1. The domed area 12 can be seen with its convex side 26 and its concave side 28. An enlarged portion of one side of the assembly 10 is illustrated in FIG. 3. As can be seen, the rupture dome or shell 12 is attached or connected to annular flange 14 by means of the transition portion 19 to form the rupture disk assembly 11. A support ring 23 having an outside diameter 15 coinciding with the outside diameters of both the retaining flange portion 14 and a spacer 16 also has an inside diameter 17 such that the ring 23 provides support for the inside diameter 18 of the retaining flange portion 14 and the transition portion 19. The spacer 16 is placed between the retaining flange portion 14 and the support ring 23. The elements 11, 16, and 23 forming the pressure relief device 10 are connected together in any well-known means such as by a spot weld 36.

While the support ring 23 is shown in FIG. 3 to have an inside diameter 17 such that the ring 23 provides support for the inside diameter 18 of the retaining annular flange portion 14, it can be seen in FIG. 1 that an optional support ring may include an area 24 forming a folding area about which a reversed dome or petal formed thereby can bend. In the particular area 24 the inside diameter 17 of the support ring 23 is less than the inside diameter 18 of the novel retaining flange portion 14.

As will be understood, the thickness of the spacer 16 is only a few thousandths of an inch. However, it provides sufficient space between the support ring 23 and the annular retaining flange portion 14 so that removal of the ruptured portion of the flange 14 is enabled.

Figure 4:
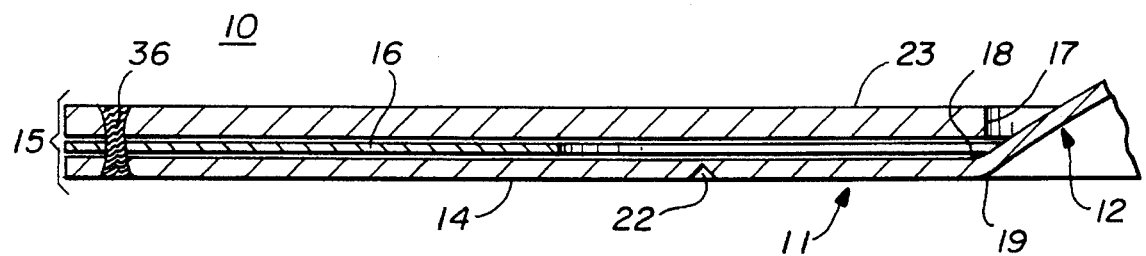
FIG. 4 is similar to FIG. 3 except that the rapture disk is mounted in the opposite direction to form a forward-acting rupture disk assembly.

In the embodiment illustrated in FIG. 4, the rupture disk is shown in a reversed position in the assembly 11 such that the convex side of the dome 12 is on the side of the support ring 23. In this case, the score line 22 is again formed in the annular flange portion 14 and the pressure relief device 10 is formed as a forward-acting domed rupture disk assembly when pressure is applied to the concave side of the dome 12. As can be seen in both FIGS. 3 and 4, the annular flange portion 14 has a flat shape. It can also be seen in FIGS. 3 and 4 that the score line 22 is substantially V-shaped in cross section. As can be seen in FIG. 1, the score line 22 includes a first end 38 positioned a spaced distance apart from a second end 40 thereof. The flange portion 14 includes an unscored connecting portion 42 substantially between the ends 38 and 40 of the score fine 22 for preventing disk fragmentation when the disk dome 12 ruptures along score line 22. Further, it will be noted that the end portions 38 and 40 of the score line 22 are located at points further from the inner diameter 18 of the retaining flange portion 14 of the disk assembly than the distance in the area 32 between the score line 22 and the inside diameter 17 of the support ring 23. As stated earlier, this enables the device to rupture easily at the "set point" but causes an increased resistance to tearing and/or pulling the flange material from between the flange holders as the rupture progresses toward the end portions 38 and 40 thereby further increasing the tendency to retain the "petal" formed by the rupture between the flange holders 51 and 52 in FIG. 6.

As stated earlier, and as can be seen in FIGS. 1 and 3, the annular spacer 16 between the disk flange 14 and the support ring 23 has an outside diameter 15 that coincides with the outside diameter of the disk flange 14 and the support ring 23. It also has an inside diameter 21 such that the annular spacer 16 does not cover the eccentric score line 22 as can be seen in FIG. 3 and in FIG. 1. A plurality of spot welds 36 connect the annular spacer 16 between the disk flange 14 and the supporting ring 23 in a fixed relationship to form the assembly 10.

In the optional support ring shape shown in FIG. 1, the annular support ring 23 has an inside diameter 17 that is in an arcuate shape having first and second spaced ends 44 and 46 that terminate in substantially the same area of the disk flange 14 as the ends 38 and 40 of the score line 22. The portion 24 of the support ring 23 connects the first and second ends 44 and 46 of the support ring 23 inside diameter 17 to form the hinge area 24 for causing the disk dome 12 to fold about the :hinge area 24 when ruptured.

The annular support ring 23 is separated from the disk flange 14 by the spacer 16 as indicated. The annular support ring 23 has an inside diameter 17 and an outside diameter 15. As previously stated, the outside diameter 15 of the disk flange 14, the spacer 16, and the support ring 23 are all substantially coterminous as shown in FIG. 3 at 15. It will be noted in FIG. 1 and FIG. 3 that the eccentric score line 22 is formed in the flange portion 14 in an area between the inside diameter 21 of the spacer 16 and the inside diameter 18 of the disk flange portion 14. It will also be noted that the inside diameter 17 of the support ring 23 provides support for the inside diameter 18 of the annular flange portion 14 as stated previously.

Thus the unit in FIG. 3, while shown in an enlarged view for purposes of clarity, should be considered to have the spacer 16 in engagement with both the support ring 23 and the annular retaining flange portion 14. The spacer in actual size is only a few thousandths of an inch thick but it does provide the space 48 necessary to enable the ruptured portion of the annular retaining flange 14 that is attached to the dome 12 to be pulled from between the mounting flanges 50 and 52 shown in FIG. 6.

Figure 5:
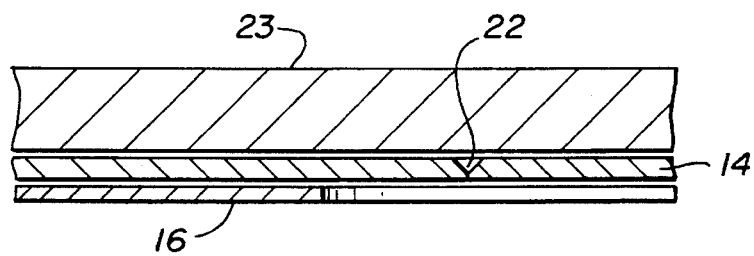
FIG. 5 is a partial cross-sectional view of an alternate embodiment of the novel assembly.
Figure 6:
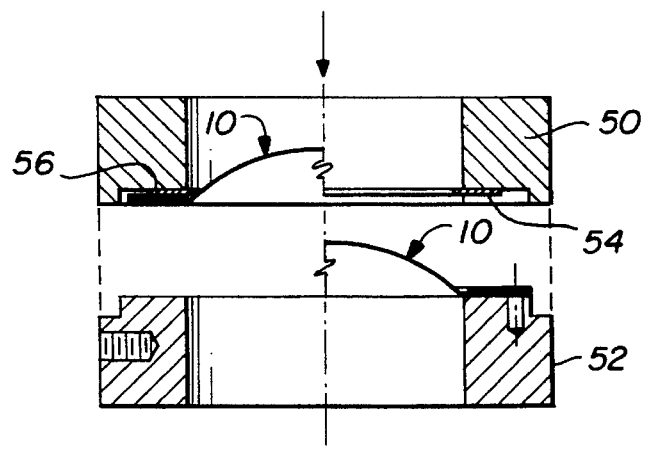
FIG. 6 is a cross-sectional view of the inlet and outlet holders in which the novel assembly may be mounted.

In the embodiment illustrated in FIG. 5, the spacer 16 is placed between the retaining flange portion 14 and one of the mounting flanges 50 or 52 shown in FIG. 6. The spacer 16 in this case again provides the small space necessary for the separated flange portion 14 of the rupture disk to pull from between the mounting flanges 50 and 52 as the rupture tear increases.

The mounting flanges 50 and 52 shown in FIG. 6 hold the assembly 10 as illustrated. The circular projection shown in cross section at 54 and 56 on the flange 50 provides a "bite"-type seal in the inlet flange 50. Only a half of the disk assembly 10 is shown in each of the inlet and outlet flanges 50 and 52, respectively, for illustration purposes. These raised portions or projections shown at 54 and 56 force their way partially into the portion of the assembly shown in FIG. 3, FIG. 4, and FIG. 5 thus holding the assembly 10 tightly between the flange portions 50 and 52.

Figure 7:
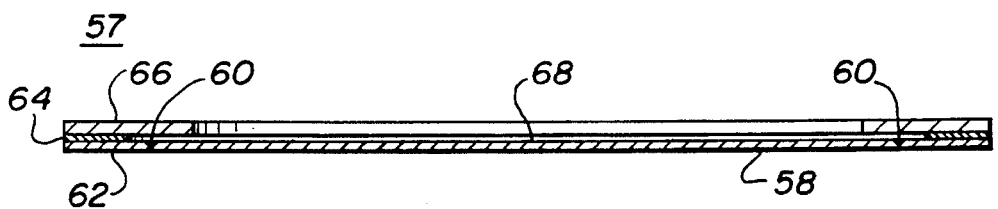
FIG. 7 is a cross-sectional view of an alternate embodiment having a flat rapture disk instead of a domed rapture disk.

FIG. 7 is a cross-sectional view of an alternate embodiment of the present invention including a flat rupture disk portion 58 of assembly 57, the flat disk portion 58 having a central portion 68 and an integrally formed flange portion 62 and wherein the eccentric score line 60 is formed in the retaining flange 62 instead of the retaining flange 14 of a domed rupture disk 11 shown in FIG. 4. In FIG. 7, the eccentric score line 60 is shown in the retaining flange 62 and is eccentric with respect to the outside diameter of flat disk portion 58. As can be seen, the retaining flange portion 62 lies under the support ring 66 and is separated therefrom by spacer 64. The assembly 57 is placed between holders as shown in FIG. 6. The unit or assembly 57 otherwise functions substantially as described previously with respect to the embodiment shown in FIG. 4.

Thus, there has been disclosed a novel improved safety pressure relief device that has a domed buckling disk portion with a retaining flange having an inside diameter and an outside diameter and a central bulged dome portion connected to the inside diameter by a transition portion. The bulged dome portion has a convex side and a concave side and the disk has a rated pressure on one side thereof at which the disk buckles in the direction of pressure. The improved device includes an arcuate score line formed on the flange portion of the disk that is eccentric with the bulged portion. The eccentric score line creates a line of weakness such that pressure applied to the bulged portion in excess of a predetermined amount causes the disk to rupture along the eccentric score line that has an increased resistance to tearing and/or pulling of the flange material from between the flange holders as the rupture increases along the score line thus assuring that the ruptured portion is retained in the assembly after the rupture.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. In a safety pressure relief device for placement between flange holders in a pressure system and including a buckling disk assembly having a retaining flange portion with an inside diameter and an outside diameter and a central bulged dome portion connected to the inside diameter by a transition portion, said bulged dome portion having a convex side and a concave side and said disk having a rated pressure on one side thereof at which said disk buckles in the direction of pressure, the improvement comprising:

an arcuate score line formed on the flange portion of said disk eccentric with said bulged portion;

said eccentric score line creating a line of weakness such that, when mounted between said flange holders, rated pressure applied to said bulged portion causes said disk to rupture along said eccentric score line; and said eccentric score line having an increasing resistance to tearing said flange portion from between said flange holders as the rupture moves along the arcuate score line tires assuring that the ruptured portion is retained with the device.

2. A device as in claim 1 wherein said flange portion includes:

a first side associated with said concave surface; and said score line being formed in said first side of said flange portion to form a reverse buckling domed rupture disk assembly when pressure is applied to said convex side of said dome.

3. A device as set forth in claim 1 wherein said flange portion includes:

a first side associated with said convex surface; and said score line being formed in said first side of said flange portion to form a forward-acting domed rupture disk assembly when pressure is applied to said concave side of said dome.

4. A device as set forth in claim 1 wherein said flange portion has a flat annular shape.

5. A device as set forth in claim 1 wherein said score line is substantially V-shaped in cross section.

6. A device as set forth in claim 1 wherein:

said arcuate score line includes a first end thereof positioned a spaced apart distance from a second end thereof; and said flange portion includes an unscored connecting portion between the ends of said score line for assisting in preventing disk fragmentation when said disk ruptures.

7. A device as set forth in claim 6 wherein said first and second end portions of said eccentric score line are located at points further from said inner diameter of said retaining flange portion of said disk assembly than any other portion of said eccentric score line.

8. A device as set forth in claim 1 further including:

an annular support ring on one side of and supporting said disk flange, said support ring having an outside diameter substantially coinciding with said flange portion outside diameter; and an annular :spacer on the other side of said disk flange, said annular spacer having an outside diameter coinciding with the outside diameter of both said disk flange and said support ring, and an inside diameter such that the annular spacer does not cover said eccentric score line.

9. A device as set forth in claim 8 further including connecting means for attaching said annular spacer, said disk flange, and said support ring to each other in a fixed relationship.

10. A device as set forth in claim 9 wherein said connecting means is at least one spot weld.

11. A device as set forth in claim 8 wherein:

said annular support ring has an inside diameter that is in an arcuate shape, said inside diameter having an arcuate portion with first and second spaced ends terminating in substantially the same area of said disk flange as the ends of said score line; and the portion of said annular support ring connecting said first and second ends of the support ring inside diameter forming a hinge area for causing said disk dome to fold about said hinge area when ruptured.

12. A device as set forth in claim 1 further including:

an annular support ring on one side of and supporting said disk flange;

a spacer separating said annular support ring and said disk flange;

said annular support ring having an inside and an outside diameter, the outside diameter of said disk flange, said spacer, and said support ring all being substantially coterminous;

said eccentric score line being formed in said flange portion in the area between the inside diameter of said spacer and the inside diameter of said disk flange portion; and the inside diameter of said support ring forming a support surface for the inside diameter of said disk flange portion.

13. A device as set forth in claim 10 further including attachment means for rigidly connecting said annular support ring, said annular spacer, and said annular flange portion in fixed relationship to each other.

14. A device as set forth in claim 12 wherein:

said annular support ring has an inside diameter that is in an arcuate shape, said inside diameter having an arcuate portion with first and second spaced ends terminating in substantially the same area of said disk flange as the ends of said score line; and the portion of said annular support ring connecting said first and second ends of the support ring inside diameter forming a hinge area for causing said disk dome to fold about said hinge area when ruptured.

15. In a safety pressure relief device for a pressure system and including a flat, circular, rupturable disk having a central portion integrally formed with a flange portion for placement between flange holders and having an outside diameter and a rated pressure at which said central portion ruptures in the direction of pressure, the improvement comprising:

an arcuate score line formed on the flange portion of said disk eccentric with the outside diameter of said disk;

said eccentric score line creating a line of weakness such that rated pressure applied to said central portion causes said disk to rupture along said eccentric score line; and said eccentric score fine having an increased resistance to tearing the flange portion from between said flange holders as the rupture moves along the arcuate score line thus assuring that the ruptured portion is retained with said device.

* * * * *